United States Patent [19]
Watanabe

[11] 3,933,559

[45] *Jan. 20, 1976

[54] PROCESS FOR MANUFACTURING A BODY OF MOISTURE-PROOF CONTAINER FOR PACKAGING

[75] Inventor: Tetsuo Watanabe, Kokubunji, Japan

[73] Assignee: Dai Nippon Printing Company Limited, Tokyo, Japan

[ * ] Notice: The portion of the term of this patent subsequent to July 15, 1992, has been disclaimed.

[22] Filed: Dec. 26, 1973

[21] Appl. No.: 428,410

[30] Foreign Application Priority Data
Aug. 7, 1973  Japan.............................. 48-88030

[52] U.S. Cl. ............... 156/211; 156/224; 156/257; 206/538
[51] Int. Cl.² B29C 17/03; B32B 3/30; B65D 85/42
[58] Field of Search ....... 29/475, 527.1, 527.2, 480; 156/211, 222, 224, 210, 212, 229, 245, 253, 268, 285, 292, 309, 257; 206/42, 437, 538; 229/3.5 MF; 161/69, 113, 119, 120, 127, 131; 93/1 D

[56] References Cited
UNITED STATES PATENTS

| | | |
|---|---|---|
| 2,618,381 | 11/1952 | Gilbert............................... 156/311 |
| 3,145,112 | 8/1964 | Boegershausen.............. 229/3.5 MF |
| 3,311,229 | 3/1967 | Troll et al............................ 206/437 |
| 3,331,495 | 7/1967 | Leckzik et al. ....................... 206/42 |
| 3,371,404 | 3/1968 | Lemelson........................... 29/527.2 |
| 3,645,822 | 2/1972 | Widiger et al. ..................... 156/309 |
| 3,778,323 | 12/1973 | Posner ............................... 156/285 |
| 3,780,856 | 12/1973 | Braverman.......................... 206/42 |

Primary Examiner—Douglas J. Drummond
Assistant Examiner—Basil J. Lewris
Attorney, Agent, or Firm—Stewart and Kolasch, Ltd.

[57] ABSTRACT

A process for manufacturing a body of a moisture-proof container having at least two recesses for packaging purposes which comprises adhering a metal foil to a first thermoplastic resin film with a hot melt-type adhesive to form a laminated sheet, forming at least two closed blank portions in said laminated sheet by cutting only the metal foil, adhering a second thermoplastic resin film on the surface of the metal foil and stretch-forming said closed blank portions of the laminated sheet at a temperature wherein the hot melt-type adhesive and the thermoplastic resin films are softened, thereby forming said recesses.

15 Claims, 8 Drawing Figures

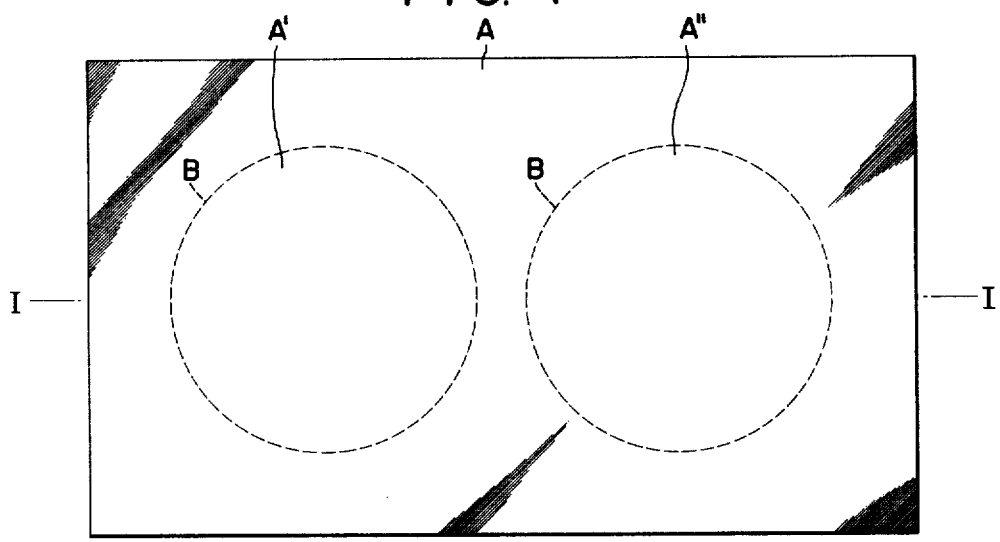
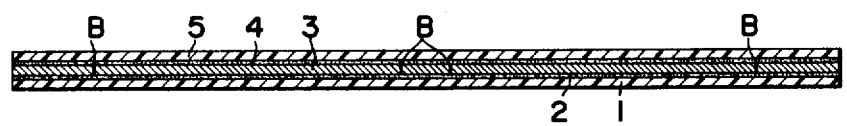
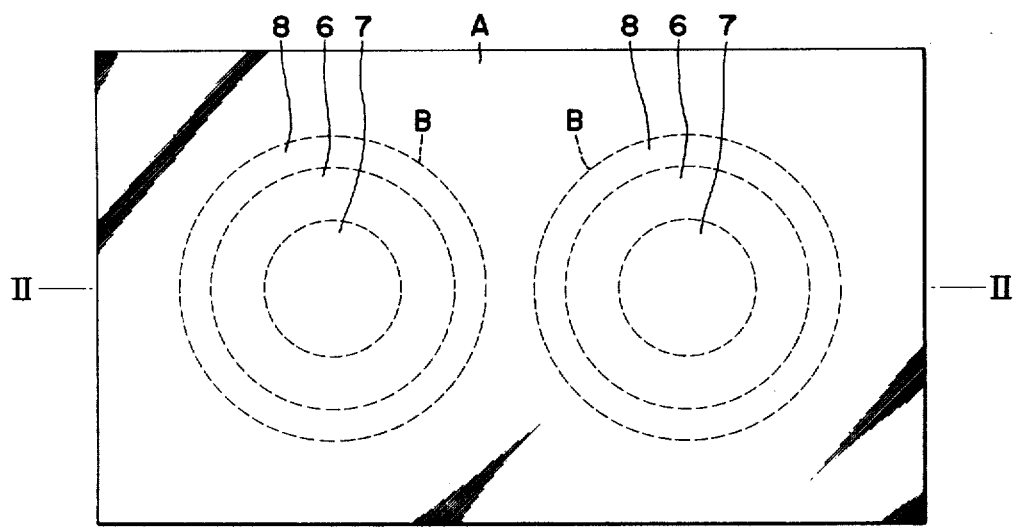
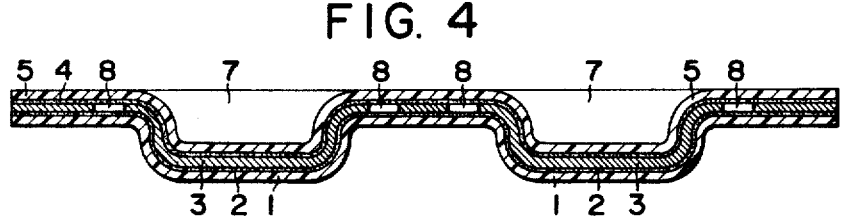

PROCESS FOR MANUFACTURING A BODY OF MOISTURE-PROOF CONTAINER FOR PACKAGING

The present invention relates to a process for manufacturing the body of a moisture-proof container for packaging, and more particularly, to a process for manufacturing the body of a moisture-proof container having at least two connected recesses for packaging materials from a laminated sheet which is made by adhering a metal foil to a thermoplastic resin film with a hot melt type adhesive.

Recently, the requirements of a very high moisture-proof container for packaging has been gradually increased in order to package medical tablets, foods, superfine machine parts and various goods which must avoid moisture.

The manufacturing of the body of a moisture-proof container having only one recess for packaging various materials is almost never carried out except in an extraordinary case whereas moisture-proof container having many connected recesses for packaging materials have been frequently used.

In the prior process for manufacturing the body of a moisture-proof container, generally, a thermoplastic resin film having a moisture-proofness, for example, polyvinylidene chloride film alone, or a thermoplastic resin film which is endowed with a moisture-proofness, for example, a polyvinyl chloride film covered with polyvinylidene chloride in the form of a coat or film is softened by a heating and thereafter the softened film is pressure-formed or vacuum-formed to obtain a body of a moisture-proof container having at least two connected recesses for pacakging materials.

These prior processes are a kind of stretch forming process and are therefore applicable to materials which can be elongated 100 to 200 percent or more by heating and softening a thermoplastic resin film.

However, it is impossible to manufacture the body of a moisture-proof container for packaging materials by using a laminated sheet made by adhering a thermoplastic resin film and the metal foil by a conventional forming method, because the metal foil breaks in the course of the forming process.

The reason why said body can not be manufactured utilizing conventional forming methods is due to the fact that the elongation percentage of the material to be formed in the forming step must be 100 percent or more. However, the maximum elongation percentage of the metal foil is about 20 to 30 percent and consequently the metal foil breaks in the forming step.

In order to overcome these disadvantages, I the applicant has previously invented a process for manufacturing a body of a moisture-proof container having at least two connected recesses for packaging materials characterized in that a metal foil is adhered on a thermoplastic resin film with a hot melt type adhesive to form a laminated sheet and then only the metal foil of the laminated sheet is cut to form at least two blank portions having a form corresponding to the materials to be packaged and the blank portions of the laminated sheet are stretch-formed by using a forming mold comprising at least two punches and a corresponding die at a temperature at which the hot melt type adhesive is softened. This process is described in U.S. Pat. application Ser. No. 401,608, filed Sept. 28, 1973.

According to this process, the circumference of the blank portion of the metal foil can be stretch-formed toward the center of the die as the forming process proceeds, because the hot melt type adhesive is softened and the softened adhesive layer serves as a lubricant and also because the circumference of the blank portion has been already cut. Therefore, the blank portion can be stretch-formed without breaking the metal foil.

Although the stretch-forming can be carried out without breaking the metal foil from the laminated sheet comprising the thermoplastic resin film and the metal foil in the above-mentioned process, a wrinkle is frequently formed in the flange portion of the body of the formed moisture-proof container for packaging.

An object of the present invention is to overcome this disadvantage in the above-mentioned process.

A further object of the present is to provide a process for manufacturing the body of a moisture-proof container having at least two connected recesses for packaging various materials by using a laminated sheet made by adhering a thermoplastic resin film to a metal foil, and by forming at least two recesses in the laminated sheet without breaking the metal foil and also without forming wrinkles in the flange portion of recesses of the body of the formed moisture-proof container.

According to the present invention, formation of the flange wrinkles have been eliminated by strengthening the metal foil of the laminated sheet by adhering another thermoplastic resin film on the surface of the metal foil so that the force for pressing the blank holder can be increased.

Therefore, the essential feature of the present invention is a process for manufacturing the body of a moisture-proof container having at least two connected recesses for packaging the contents characterized in that a metal foil is adhered on a thermoplastic resin film with a hot melt type adhesive and then only the metal foil is cut to form at least two blank portions having a desired form and then a thermoplastic resin film is adhered on the surface of the metal foil to form a laminated sheet. The blank portions of the laminated sheet are then stretch-formed by using a forming mold comprising at least two punches and a corresponding die, at a temperature higher than the temperature at which the hot melt type adhesive and the thermoplastic resin are softened.

Examples of the thermoplastic resin films which may be used in the process of the present invention include polyvinyl chloride, polyethylene, polypropylene, polyesters, polycarbonates and the like. The preferable thermoplastic resin film is polyvinyl chloride film. The thickness of the thermoplastic resin film is 100 to 500 $\mu$, preferably 150 to 300 $\mu$, very preferably 150 to 200 $\mu$.

Examples of the metal foil which may be used in the process of the present invention, include a foil of aluminium, tin, copper, iron and the like. The preferable metal foil is aluminium foil. The preferable thickness of the metal foil is 30 to 150 $\mu$, preferably 40 to 70 $\mu$.

The hot melt type adhesive which may be used in the process of the present invention comprises, as the main component one of ethylene-vinyl acetate copolymer, polyvinyl acetate, polyvinylbutyral, polyethylene or a polyamide to which is added a rosin, an ester gum or a paraffin. The thickness of the hot melt type adhesive is 3 - 30 $\mu$, preferably 10 to 15 $\mu$.

The adhesive which is used for adhering a thermoplastic resin film to the metal foil in the process of the present invention is preferably Vylon 300 (manufactured by Toyo Spinning Co, Ltd., main component is a saturated polyester resin) or saturated polyester-isocyanate type adhesive. The thickness of this adhesive is 3 to 20 $\mu$, preferably 5 – 10 $\mu$.

Due to the fact that the metal foil is already cut and the adhesion of the lowest thermoplastic resin film with the metal foil is carried out by the use of a hot melt adhesive, according to the present invention, the metal foil can be draw-formed without breaking it, and since the laminated sheet is formed by adhering the thermoplastic resin film on an surface of the metal foil with the adhesive, in the case of the use of the hot melt type adhesive, the hot melt type adhesives provided on the surface and the back of the metal foil are softened at the time of stretch-forming operation and as a result the adhesive serves as a lubricant. Also the force for pressing the blank holder can be increased due to the presence of the thermoplastic resin film on the surface of the metal foil which eliminates flange wrinkles. In the case of the use of the above-mentioned Vylon 300 or saturated polyester-isocyanate type adhesive as the adhesive, the metal foil and the thermoplastic resin film, in an adhered state, are simultaneously formed toward the center of the die as the forming operation is carried out and as a result the metal foil is strengthened by the presence of the thermoplastic resin film at the time of the forming operation and also no occurance of the flange wrinkle is generated due to the fact that the force for pressing the blank holder can be increased.

The manufacture of the body of moisture-proof container having two recesses for packaging materials according to the present invention is illustrated in detail with reference to the following drawings, wherein FIG. 1 is a plan view of a laminated sheet which may be used in the process of the present invention;

FIG. 2 is a sectional view taken along line I—I of FIG. 1;

FIG. 3 is a plan view of the body of moisture-proof container having two connected recesses for packaging materials after the forming of the laminated sheet;

FIG. 4 is a sectional view taken along line II—II of FIG. 3;

Figure 5:
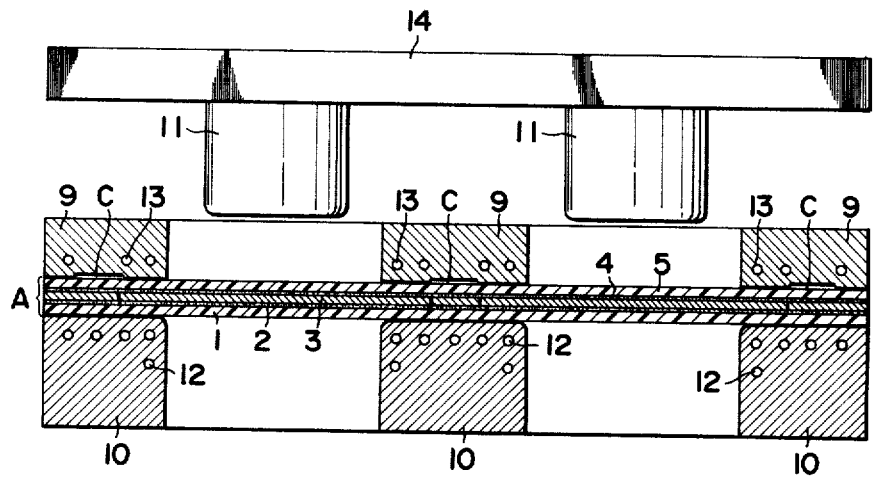
FIG. 5 is a sectional view of a stretch-forming machine which shows mainly two punches and the corresponding die before the stretch-forming.

In FIG. 1, A is a laminated sheet prior to the stretch-forming operation and is obtained by adhering a thermoplastic resin film 1 with a metal foil 3 through a hot melt type adhesive 2 and by cutting only metal foil as shown by the dotted line B in FIG. 1 and by a solid line B in FIG. 2 to form blank portions A' and A'' and then by adhering a thermoplastic resin film 5 on the surface of the metal foil 3 with an adhesive 4.

In FIG. 4, elements 1, 2, 3, 4 and 5 are the same as those shown in FIGS. 1 and 2 and the dotted line B in FIG. 3 and the solid line B in FIG. 4 are respectively a cutting line similarly as shown in FIGS. 1 and 2. Elements 6 and 7 are respectively a flange portion and a recess for packaging the contents of the body of the stretch-formed container and 8 is a gap which is created by moving the circumferences of the blank portions of the metal foil at the stretch-forming.

In the following, the operation for stretch-forming the body of mositure-proof container having two connected recesses for packaging materials as shown in FIGS. 3 and 4 from the laminated sheet shown in FIGS. 1 and 2 is illustrated with reference to FIGS. 5 and 6 in which the portion of the punch and die of the stretch-forming machine comprising two punches and the corresponding dies are mainly shown.

Figure 6:
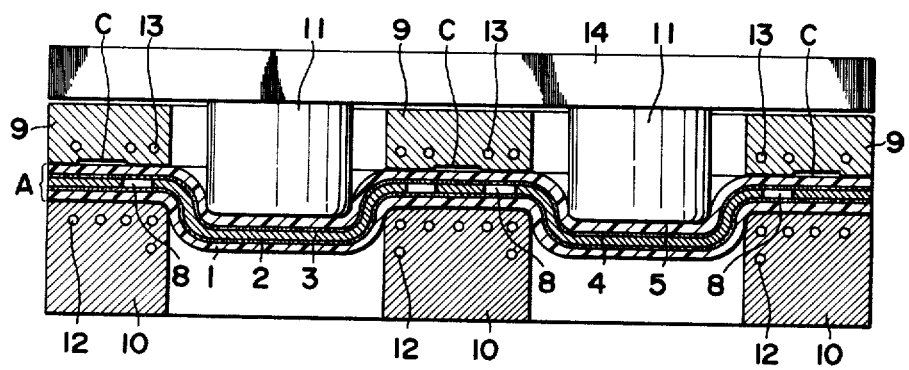
FIG. 6 is a sectional view of a stretch-forming machine which shows mainly two punches and the corresponding die after the stretch-forming.

In FIGS. 5 and 6, A is a laminated sheet, 9 is a blank holder for preventing an occurrence of a flange wrinkle, 10 is a die, 11 is a punch, 12 is a cooling device which is provided in the blank holder 9 and 14 is a plate for supporting the punch 11. In order to faciliate the stretch-forming operation a shallow recess C is provided at the under part of the blank holder 9.

In the practice of the operation, as shown in FIG. 5, the laminated sheet A is placed on the die 10 which is cooled by the cooling device 12 and the blank portions A' and A'' of said laminated sheet A are placed so as to be positioned under the punches 11 which are fixed to the punch supporting plate 14 and then the laminated sheet is supported between the die 10 and a blank holder 9 which is heated by the heating device 13. In this case, the forming temperature is a temperature at which the hot melt type adhesive 2 and also the thermoplastic resin films 1 and 5 can be softened.

As shown in FIG. 6, the punches 11 which are fixed to the plate 14 for supporting them are lowered and the blank portions A' and A'' of the laminated sheet A are stretch-formed. Thereafter, the punches 11 are pulled up and then the body of moisture-proof container for packaging the contents is withdrawn after the hot melt type adhesive is solidified.

Figure 7:
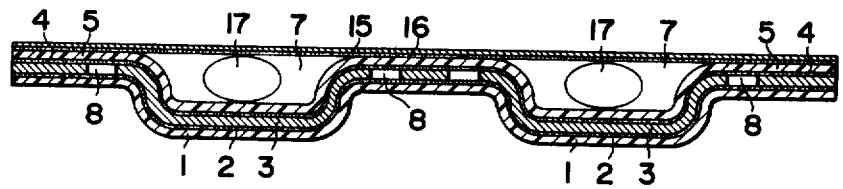
FIG. 7 is a sectional view of a container which is made by using the body of moisture-proof container which is made by the process of the present invention.

Although the body of the moisture-proof container for packaging is made in the process of the present invention, a moisture-proof container for packaging can be made by adhering a laminated sheet, which has a moisture-proofness and is made by adhering a metal foil with a thermoplastic resin film, as a lid, on the body of moisture-proof container as shown in FIG. 7. Also, a moisture-proof container for packaging can be made by oppositely adhering two bodies of the moisture-proof0215 container for packaging which are produced by the process of the present invention. In FIG. 7, elements 1, 2, 3, 4, 5 and 8 are same as those shown in FIG. 4 and 15 is a metal foil, 16 is a heat-sealable adhesive layer and 17 is the content.

Figure 8:
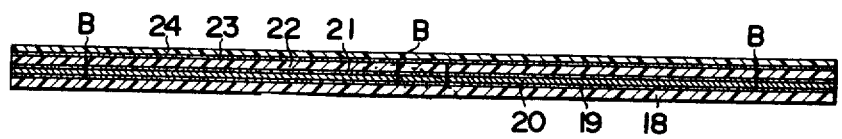
FIG. 8 is a sectional view of another laminated sheet which may be used in the process of the present invention.

Furthermore, the body of the moisture-proof container for packaging can be manufactured by the above mentioned method even when the laminated sheet shown in FIG. 8 is used in the process of the present invention. In FIG. 8, 18 is a thermoplastic resin film, for example a hard polyvinyl chloride film having a thickness of 150 to 300 $\mu$, 19 is a layer of hot melt adhesive having a softening point of 60° to 70°C. (thickness: 5 to 10 $\mu$), 20 is a metal foil, for example aluminium foil having a thickness of 30 to 50 $\mu$, 21 is a layer of an adhesive, for example the adhesive in which Vylon 300 is added with an isocyanate type adhesive and which has a softening point of more than 120°C., 22 is a thermoplastic resin film, for example polyester type resin film having a thickness of 10 to 20 $\mu$, 23 is a layer of hot melt adhesive having a softening point of 60° to 70°C. or of adhesive having a softening point of 100° to 110°C. such as Vylon 300, 24 is a thermoplastic resin film, for example a hard polyvinyl chloride film having a thickness of 30 to 50 μ and B shows a cutting line.

By the way, only the production of a body of the moisture-proof container having two connected recesses for packaging the contents is explained above in the process of the present invention, but the number of the recesses is not limited and thus a very large number of recesses, for example, 100 units of recesses can be formed in the body of the moisture-proof container for packaging the contents.

As explained above, since the metal foil is not broken and also since the flange wrinkle of recess are eliminated, the body of the container is moisture-proof. Therefore, a completely moisture-proof container having two or more recesses for packaging the contents can be made by adhering a moisture-proof lid to the body of the container, or by adhering one body of the container to another body thereof. According to the present invention, therefore, it is possible to obtain a container for packaging which requires a remarkable moisture-proofness for packaging medical tablets, foods and superfine machine parts.

The present invention is illustrated by the following examples.

EXAMPLE 1

10 g/m² of hot melt adhesive consisting of ethylene-vinyl acetate copolymer having a softening point of 60° – 70°C. is coated on hard polyvinyl chloride film having the thickness of 150 μ and then aluminium foil having the thickness of 70 μ is adhered thereon by a hot roll. Only the aluminium foil of the above obtained three layered laminated sheet is cut to form two circular blank portions having a diameter of 24 mm. 10 g/m² of polyester type adhesive is then coated on the whole surface of the aluminium foil of the above three layered laiminated sheet and thereafter a hard polyvinyl chloride film having a thickness of 30μ is adhered on the above coated surface to obtain a five layered laminated sheet.

A die 10 having the internal diameter of 12.6 mm and a punch 11 having the external diameter of 12.0 mm are used and a blank holder 9 is heated to maintain at a temperature of 80° – 90°C. by a heating device 13. The temperature of the die is maintained at a temperature of less than 50°C. by a cooling device 12 at the time of the forming operation. Then a laminated sheet is positioned between the blank holder and the die 10 by the use of guide pins (not shown in the drawings). As a result at the forming operation the thermoplastic resin films 1 and 5 and the hot melt type adhesive 2 are softened and two punches 11 are pressurized into the die to form two recesses having a depth of 5 mm in two blank portions of the laminated sheet. Consequently, the external diameter of the aluminium foil is draw-formed from 24 mm to 14 mm and the hard polyvinyl chloride film is stretch-formed. The aluminium foil of the obtained product is not broken and flange wrinkles are not found on the flange portions.

EXAMPLE 2

Example 1 is repeated except that a hot melt type adhesive comprising ethylene-vinyl acetate copolymer is used in place of polyester type adhesive. Similar results as shown in Example 1 are obtained.

The moisture permeability of the body of moisture-proof containers having two connected recesses for packaging materials obtained in Examples 1 and 2 are about one-fifth of that of moisture-proof containers which have same form as above and being currently sold in market. The prior product was manufactured by forming a complex sheet which was made by adhering polyvinyl chloride resin film having a thickness of 150 μ which was coated with a polyvinylidene chloride resin with a thickness of 25 μ together with the same coated polyvinyl chloride resin film.

The invention being thus described, it will be obvious that the same may be varied in many ways. Such variations are not to be regarded as a departure from the spirit and scope of the invention, and all such modifications are intended to be included within the scope of the following claims. What is claimed is:

1. A process for manufacturing a body of a moisture-proof container having at least two recesses for packaging purposes which comprises adhering a metal foil to a first thermoplastic resin film with a hot melt-type adhesive to form a laminated sheet, forming at least two closed blank portions in said laminated sheet by cutting only the metal foil, adhering a second thermoplastic resin film on the surface of the metal foil and stretch-forming said closed blank portions of the laminated sheet at a temperature wherein the hot melt-type adhesive and the thermoplastic resin films are softened, thereby forming said recesses.

2. The process as claimed in claim 1 wherein the first and second thermoplastic resin films are selected from the group consisting of polyvinyl chloride, polyethylene, polyproylene, a polyester or a polycarbonate.

3. The process as claimed in claim 1, wherein the thickness of the first and second thermoplastic resin film is 100 – 500 μ.

4. The process as claimed in claim 1, wherein the metal foil is a film selected from the group consisting of aluminium, tin, copper and iron.

5. The process as claimed in claim 1 wherein the thickness of the metal foil is 30 – 150 μ.

6. The process as claimed in claim 1 wherein the hot melt type adhesive comprises a main component selected from the group consisting of ethylenevinylacetate copolymer, polyvinyl acetate, polyvinylbutyral, polyethylene and a polyamide and an additive.

7. The process of claim 6, wherein the additive is selected from the group consisting of a rosin, an ester gum and a paraffin.

8. The process as claimed in claim 1 wherein the thickness of the hot melt type adhesive is 3 – 30 μ.

9. The process of claim 1, wherein the thickness of the first and second thermoplastic resin film is 150 – 300 microns.

10. The process of claim 1, wherein the thickness of the first and second thermoplastic resin film is 150 – 200 microns.

11. The process of claim 1, wherein the thickness of the metal foil is 40 – 70 microns.

12. The process of claim 1, wherein the thickness of the hot melt-type adhesive is 10 – 15 microns.

13. The process of claim 1, wherein a third thermoplastic resin film is adhered to the second thermoplastic film and the blank portions are made by cutting the metal foil and the second thermoplastic resin film.

14. The process of claim 1, wherein the second thermoplastic resin film is adhered to the metal foil with an adhesive selected from the group consisting of a saturated polyester type adhesive and a saturated polyester-isocyanate type adhesive.

15. The process of claim 14, wherein the thickness of the adhesive is 10 – 15 microns.

* * * * *